United States Patent [19]

Yam

[11] Patent Number: 4,620,287
[45] Date of Patent: Oct. 28, 1986

[54] METHOD AND APPARATUS FOR REPRESENTATION OF A CURVE OF UNIFORM WIDTH

[75] Inventor: David S. Yam, Eagan, Minn.

[73] Assignee: Dicomed Corporation, Minneapolis, Minn.

[21] Appl. No.: 459,394

[22] Filed: Jan. 20, 1983

[51] Int. Cl.$^4$ .............................. G06F 15/626
[52] U.S. Cl. .................... 364/518; 340/728; 340/748; 354/12; 364/521; 364/523
[58] Field of Search ............... 340/728, 729, 732, 748, 340/736-742; 364/521, 523, 518, 718, 720, 851, 852, 853; 354/4, 12

[56] References Cited

U.S. PATENT DOCUMENTS

| | | | |
|---|---|---|---|
| 3,296,428 | 1/1967 | Nathan | 364/853 |
| 3,450,865 | 6/1969 | Peras | 364/520 |
| 3,659,283 | 4/1972 | Ophir | 340/731 |
| 3,746,912 | 7/1973 | Redecker et al. | 340/743 |
| 3,789,200 | 1/1974 | Childress et al. | 340/324 R |
| 3,809,868 | 5/1974 | Villalobos et al. | 340/324 R |
| 3,828,319 | 8/1974 | Owen et al. | 364/200 |
| 4,070,710 | 1/1978 | Sukonick et al. | 364/900 |
| 4,095,216 | 6/1978 | Spicer | 340/324 AD |
| 4,115,863 | 9/1978 | Brown | 364/521 |
| 4,195,338 | 3/1980 | Freeman | 364/200 |
| 4,197,590 | 4/1980 | Sukonick et al. | 364/900 |
| 4,208,719 | 6/1980 | Lotz et al. | 364/521 |
| 4,212,009 | 7/1980 | Adleman et al. | 340/722 |
| 4,254,468 | 3/1981 | Craig | 364/523 |
| 4,298,945 | 11/1981 | Kyte et al. | 364/523 |
| 4,330,834 | 5/1982 | Murphy | 364/521 |
| 4,373,194 | 2/1983 | Demke et al. | 364/900 |
| 4,390,780 | 6/1983 | Wu et al. | 377/44 |

OTHER PUBLICATIONS

"Tex and Metafont", New Directions in Typesetting" Donald E. Knuth (1979).
"Text/File Management Systems"—Autologic Incorporated.
"APS-5 Digital CRT Typesetter by Autologic'-'—Autologic Incorporated.
"APS-Micro 5 Digital CRT Typesetter by Autologic'-'—Autologic Incorporated.
"The Seybold Report" vol. 9, No. 8 (Jan. 7, 1980) Autologic Incorporated.
"Autologic Input Command Language Manual" (Jan. 1979) Autologic Incorporated.
"Product Announcement"—Chromatics.
"Rational B-Splines for Curve and Surface Representation", (published Sep., 1983).

Primary Examiner—Errol A. Krass
Assistant Examiner—Kevin J. Teska
Attorney, Agent, or Firm—Merchant, Gould, Smith, Edell, Welter & Schmidt

[57] ABSTRACT

A graphic arts method and apparatus for representation on suitable media of curves having uniform widths is disclosed. A method and apparatus of the present invention converts curve figure data into a reduced data set which defines a plurality of interconnected curve segments defined by second order parametric Bezier curves and straight line segments. Each of the curve segments is converted into a plurality of straight line segments closely approximating the shape of the associated curve segments. The vertices of rectangles associated with each of the straight line segments are then determined such that the rectangles have a width substantially equal to the required width of the curve. The rectangle data is then presented upon suitable media as an image which closely approximates that of a curve having uniform width.

13 Claims, 24 Drawing Figures

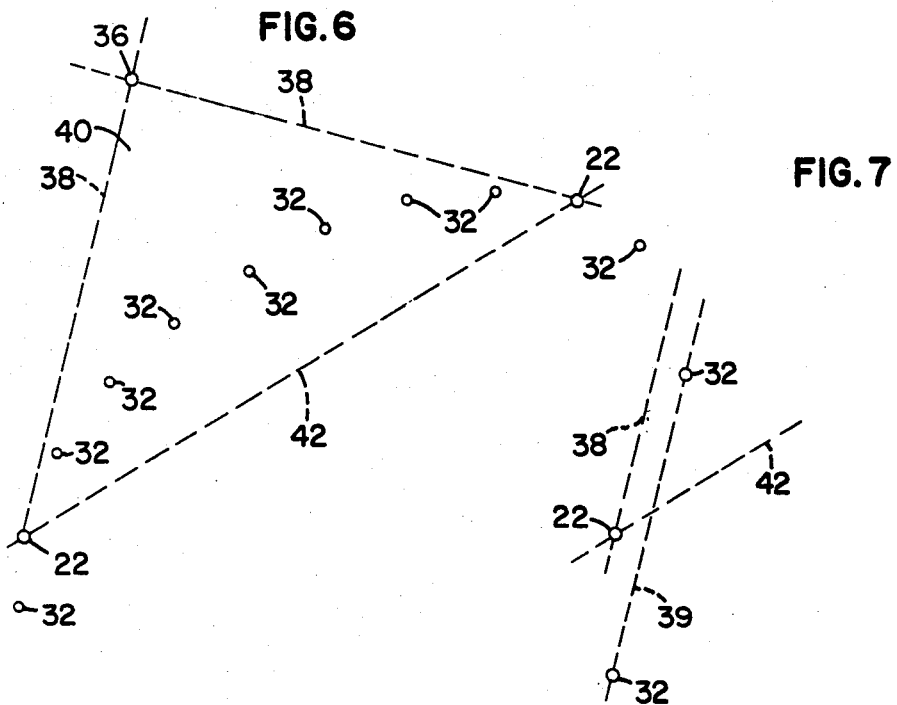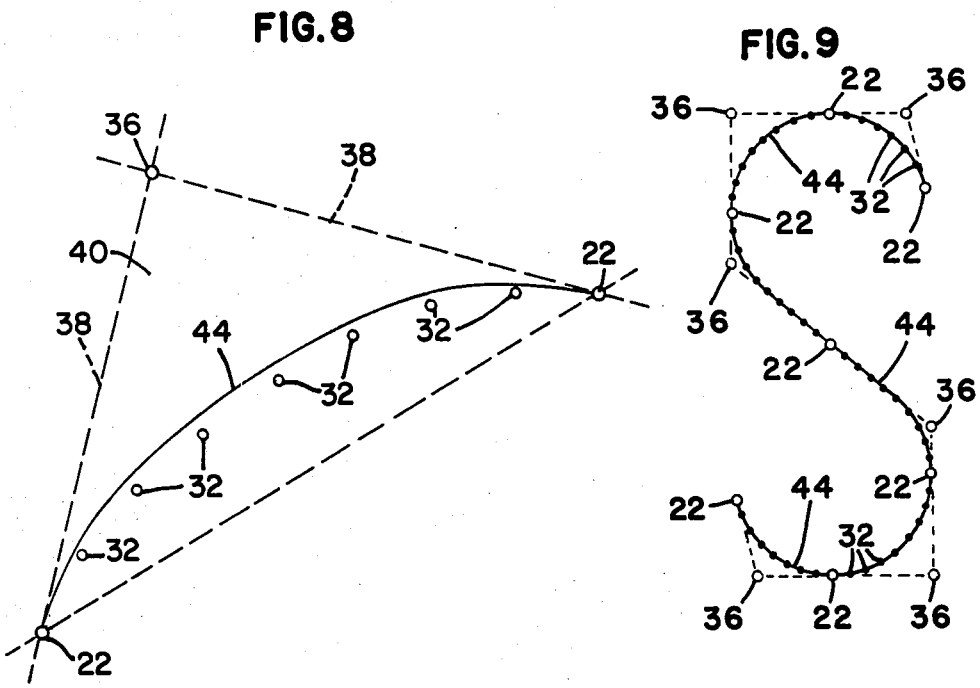

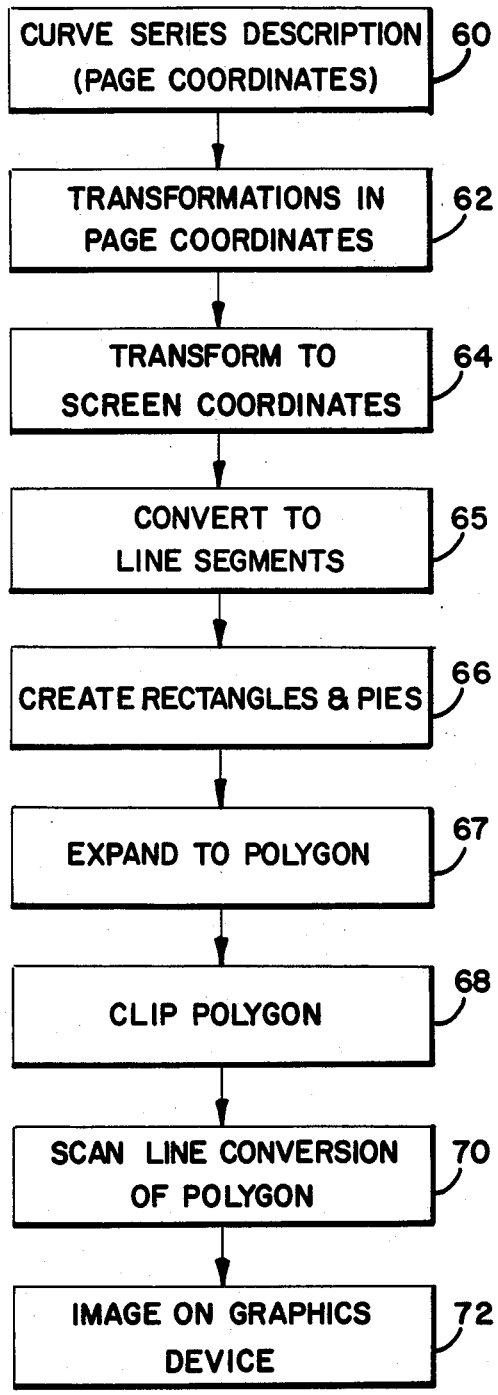
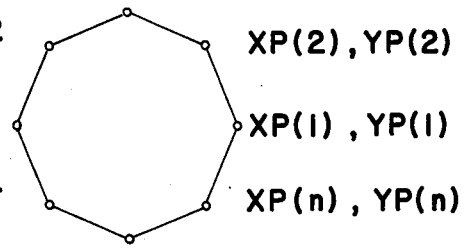
FIG. 14A
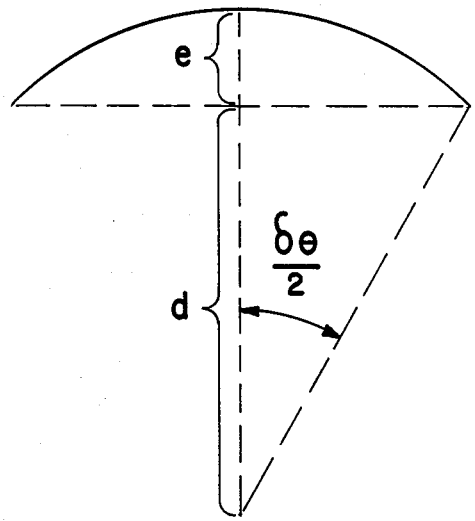
FIG. 14B
FIG. 18

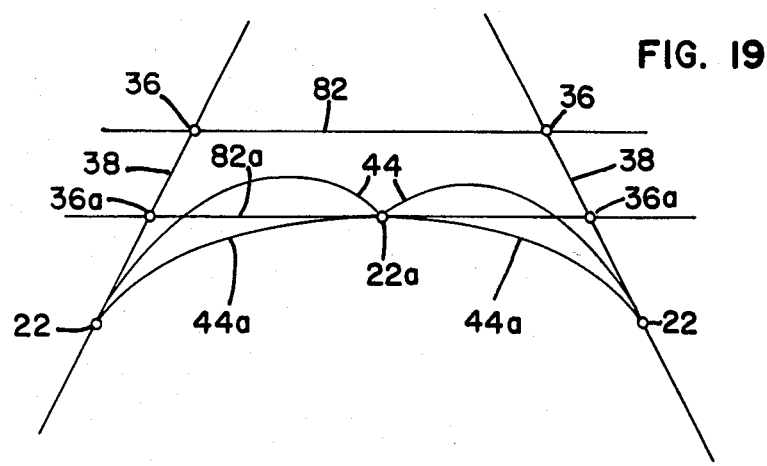
FIG. 19
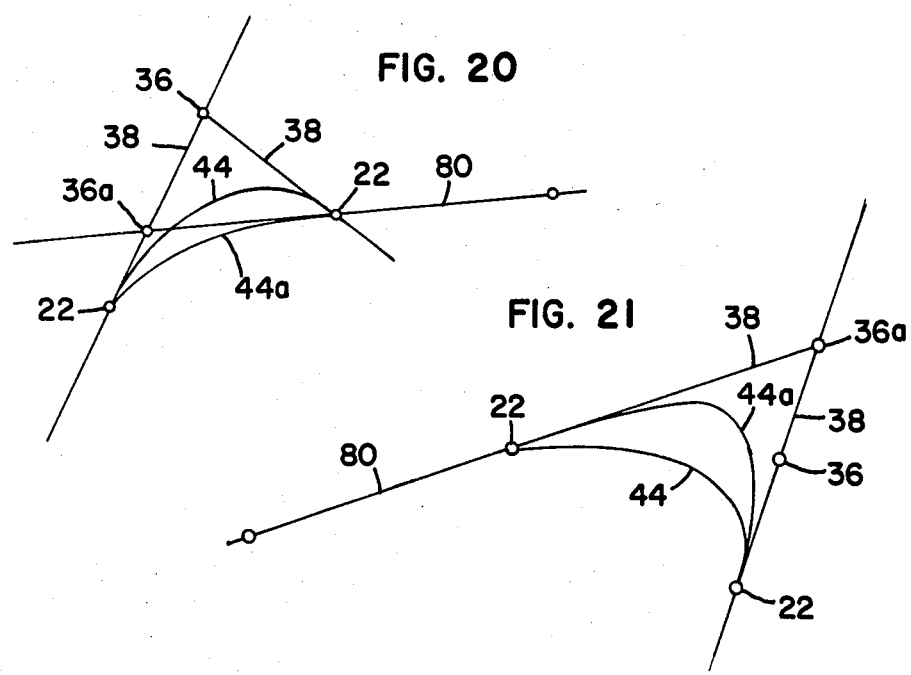
FIG. 20
FIG. 21
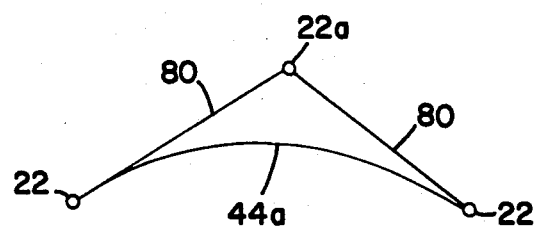
FIG. 22 ized figure data. Polygonal approximation formats
METHOD AND APPARATUS FOR REPRESENTATION OF A CURVE OF UNIFORM WIDTH

TECHNICAL FIELD

The present invention relates generally to the field of computer aided graphic arts. More specifically the invention relates to a method and apparatus for representation of and recreation of lines or curves having a predetermined, uniform width.

BACKGROUND OF THE INVENTION

Computer aided or generated graphics systems are used in a wide range of applications, including information display, creation of images for photographic and printing applications, and computer aided design and manufacturing of a wide variety of products and components. Creation of two dimensional figures via a display media is currently accomplished in the computer aided graphic arts by storing large amounts of digitized figure coordinate data. Current systems of this type are subject to certain problems in terms of the size of memory required to store a particular figure, computation time for reconstructing the figure from the stored data, and flexibility of application in terms of ability to handle arbitrary shapes, as opposed to a limited number of predetermined shapes, and flexibility in editing and manipulating these shapes.

In these prior art systems, curve fitting or smoothing of figure data, if performed, is accomplished as a post processing step and not in real time while the figure is being created. Due to the large number of coordinates required to represent a particular figure, temporary storage of a large amount of data is necessary requiring a large amount of storage media and a significant amount of extra time to process the stored data.

After the digitized figure data is stored, algorithms must be used to convert the data to an acceptable format for presentation via a display medium or viewing device. The algorithms utilized for this purpose depend heavily upon the data base used to define the figures. Many display formats such as raster and run encoded, do not allow for efficient linear transformation of the digitized figure data. Polygonal approximation formats do not guarantee smooth edges when subjected to a transformation. Furthermore, transformation time is comparatively long due to the fact that all of the figure data must be individually transformed.

These limitations of prior art computer graphic systems are especially apparent in the field of phototypesetting, where high speed operation and the ability to faithfully reproduce a wide variety of character fonts and special systems have been limited in their performance in these criteria.

In a prior application, a method and apparatus for representation of a two dimensional form on a media was disclosed which solved many of the above problems. However, there is still the problem of recreating a curve or two dimensional form of uniform width such as the border line around a two dimensional form. In addition, there is a problem of maintaining the curve width uniformity when scaling, rotating, reshaping, etc. the two dimensional form.

The present invention solves these and many other problems present in the computer aided graphic arts.

SUMMARY OF THE INVENTION

The present invention relates to a method and apparatus of providing a grahical representation of a curve with a uniform width. The present invention utilizes a set of data points generally lying along the curve by converting the data points into second order parametric equations which define a plurality of adjoining curve segments closely approximating the curve. The present invention further includes method and apparatus for converting the curve segments into straight line segments and defining in association with each of the straight line segments the vertices of a rectangle having a width equal to the width of the curve.

A particularly advantageous feature of the present invention is the provision of the ability to readily scale, rotate, reshape, etc. graphic presentations while present on a medium without disturbing the uniform width thereof.

These and various other advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

FIG. 6 is a representation of two adjacent nodes and their associated control points;

FIG. 7 is a representation of control line orientation;

FIG. 8 is a representation of a Bezier curve between two adjacent nodes;

FIG. 9 is a diagramatic representation of control points and nodes defining a letter "s";

FIGS. 14a, b are diagramatic representation of polygon definition for circles;

FIG. 18 is a diagramatic representation of a processing sequence of the present invention; and FIGS. 19 through 22 are examples of curve series editing.

DETAILED DESCRIPTION OF THE PREFERRED EMBODIMENT

For purposes of this application, a curve series is defined as a plurality of interconnected curves wherein the curves are defined by second order parametric Bezier curves and straight line segments. The present invention provides a computer based system for providing a curve series of substantially uniform, predetermined width.

Figure 1:
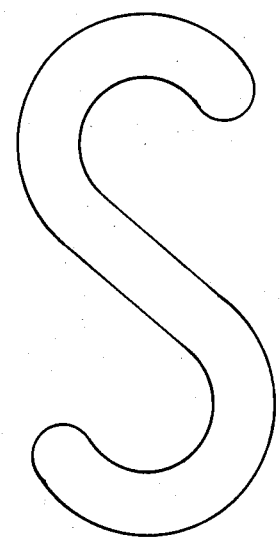
FIG. 1 is an illustration of the letter "s"
Figure 2:
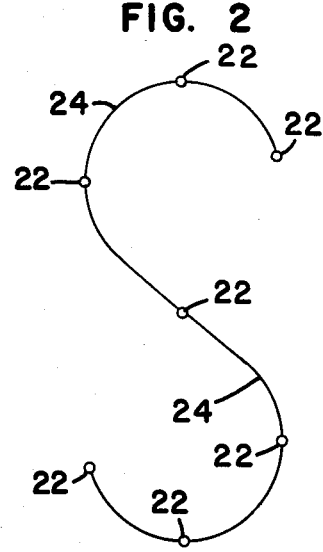
FIG. 2 is a curve series representation of the letter "s"

Illustrated in FIG. 1 is an arbitrary form which in this instance approximates the letter "s". Shown in FIG. 2 is a curve series representation of the letter "s". Note that the curve series is defined by a series of vertices or node points 22 interconnected by a series of curves 24. In this particular example there are six curves, 24 and seven node points 22. The present invention enables the curve series of FIG. 2 to be provided with a uniform width therealong so as to closely approximate the letter "s" as shown in FIG. 1.

Figure 3:
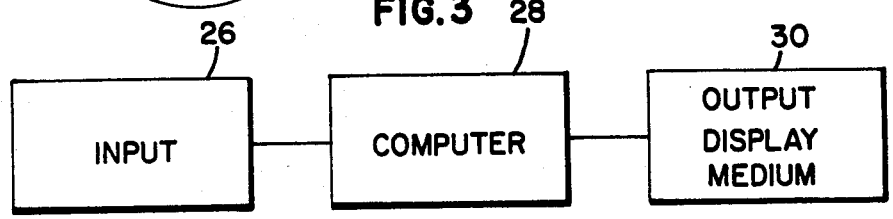
FIG. 3 is a diagramatic figure of a computer based graphic system.

As illustrated in FIG. 3, two dimensional figure data is normally obtained from an input device 26 such as a digitizing tablet. The figure data in turn is processed by a computer 28 in accordance with the present invention which in one embodiment of the present invention is a PDP 11/34 or PDP 11/23. The resulting data is then output to a display medium 30 for visual presentation of the figure for which the data was received and processed. Examples of the types of display media which might be utilized are raster scan frame buffer displays, film recorders, plotters, etc.

Figure 4:
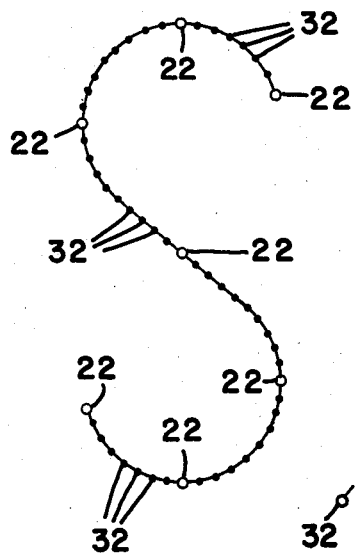
FIG. 4 is a representation of the letter "s" input data received from an input device.

In one embodiment of the present invention, figure data is obtained from a digitizing tablet. The raw figure data represents coordinate positions 32 representative of the figure as illustrated in FIG. 4 where the figure "s" data is illustrated. As the figure coordinate data 32 is obtained, the slope between two adjacent points is calculated. Those coordinates which are determined to be X maxima or minima, Y maxima or minima, inflection points, and start and end points are saved and designated as node points 22. Note that in order to determine when there is an inflection point, the slope data (S1, S2, S3) for three consecutive pairs of points 32 is saved. If either of the following conditions are met then there is an inflection point:

$$S1 > S2 < S3 \quad (1)$$

$$S1 < S2 > S3 \quad (2)$$

Figure 5:
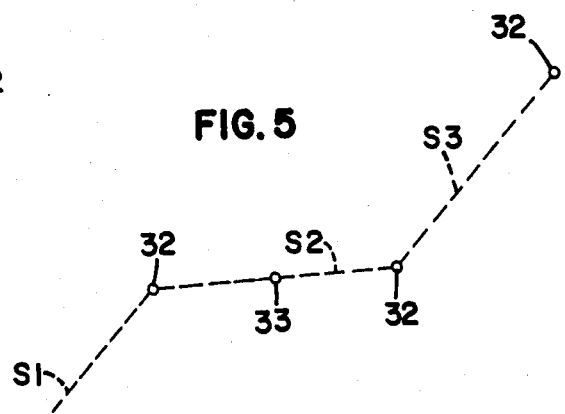
FIG. 5 is a representation of three segments S1, S2, S3.

When an inflection is detected, the midpoint 33 of the middle segment having slope S2 is used as the actual inflection point and is saved as the node point 22. Illustrated in FIG. 5 is an example of the first condition.

In FIG. 6, a group of data points 32 two of which are node points 22 is shown. At any given time during the processing of figure data, data points 32 lying on a span between adjacent nodes 22 are saved as is one data point 32 on either side of this span. When two adjacent nodes 22 are detected, a slope control point 36 is determined by the intersection of two control lines or frames 38. Control point 36 thus lies at the vertex of a triangle 40 defined by control lines 38 connecting nodes 22 to control point 36 and a base line 42 interconnecting nodes 22.

As shown in FIG. 7, each control line 38 has the same slope as and is parallel to the line 39 interconnecting data points 32 on either side of node 22 through which line 38 extends. The two nodes 22 and control point 36 may then be used to define a Bezier curve 44 as illustrated in FIG. 8 which approximates that of the figure boundary between adjacent nodes 22 as defined by data points 32. Control point 36 and nodes 22 are then stored in memory and the data points 32 are discarded except for the data point 32 immediately preceding the last node 22 detected.

Subsequent data coordinate positions 32 are then saved until a subsequent node 22 is detected at which point the processing on this set of data is performed. This processing continues for each pair of nodes 22 detected until the entire boundary of the curve series has been defined and/or terminated by the operator.

Each Bezier curve 44 is tangent to the control frames 38 at nodes 22. The Bezier curve between adjacent nodes 22 is defined by the following parametric equations:

$$X = P_0 + P_1 Z + P_2 Z^2$$

$$Y = Q_0 + Q_1 Z + Q_2 Z^2$$

Where: Z varies from 0 to 1 and where $P_0$, $P_1$, $P_2$, $Q_0$, $Q_1$, $Q_2$ are defined as follows:

$P_0 = X(i)$
$P_1 = 2[Xc(i) - X(i)]$
$P_2 = X(i) - 2Xc(i) + X(i+1)$
$Q_0 = Y(i)$
$Q_1 = 2[Yc(i) - Y(i)]$
$Q_2 = Y(i) - 2Yc(i) + Y(i+1)$

Xc(i), Yc(i) are control point coordinates between adjacent nodes whose coordinates are X(i), Y(i) and X(i+1), Y(i+1).

As illustrated in FIG. 9, node points 22 and control points 36 which are stored in memory define the curve series, in this case representative of the letter "s". Note that the dots illustrate the outline of the resulting Bezier curves 44.

The above described curve fitting processing is performed in real time as the figure data is received from the input device. In another embodiment of the present invention, selective figure data is obtained and saved in memory for later processing as desired.

The final data set which is saved in memory for representation of a given curve series includes all the detected nodes 22 and their associated control points 36. This requires much less memory than the storage of all figure data points 32 and minimizes delays due to the processing of such a large data set. Furthermore, the data set requiring transformation processing for display purposes is reduced and easier to operate on. In addition, a smooth figure boundary can be presented at any resolution at the display media.

In one embodiment of the present invention, when a span between nodes 22 is completed, the resulting Bezier curve 44 is compared with the corresponding figure data 32. If the deviation is greater than a specified threshold value, a node 22 will be added and the Bezier curve will be divided into two Bezier curves. The resulting Bezier curves are similarly tested in a recursive fashion until the threshold value is achieved.

Figure 10:
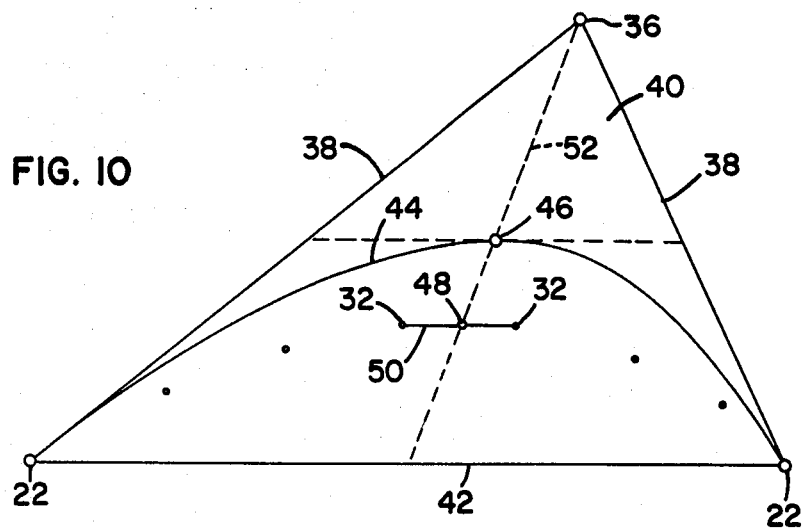
FIG. 10 is a diagramatic representation of Bezier curve deviation from actual input data.

To reduce the computational burden of generating the actual Bezier curve for the fitting test which is performed in real time, the properties of the Bezier polygon (triangle) are used to estimate the maximum deviation from the actual data. As indicated in FIG. 10, a flexer point 46 of maximum displacement of Bezier curve 44 from base 42 of triangle 40 may be quickly computed from the triangle geometry. The point 48 of maximum figure data displacement from base 42 of triangle 40 is easily computed by checking for the intersection of a line 50 with a line 52 which extends from control point 36 to a point at the midsection of base 42 of triangle 40. Line 50 is defined by the two data points 32 closest to line 52 and on either side thereof. The distance between points 46 and 48 is then computed and compared with the predetermined threshold to see if a subdivision is necessary.

Figure 11:
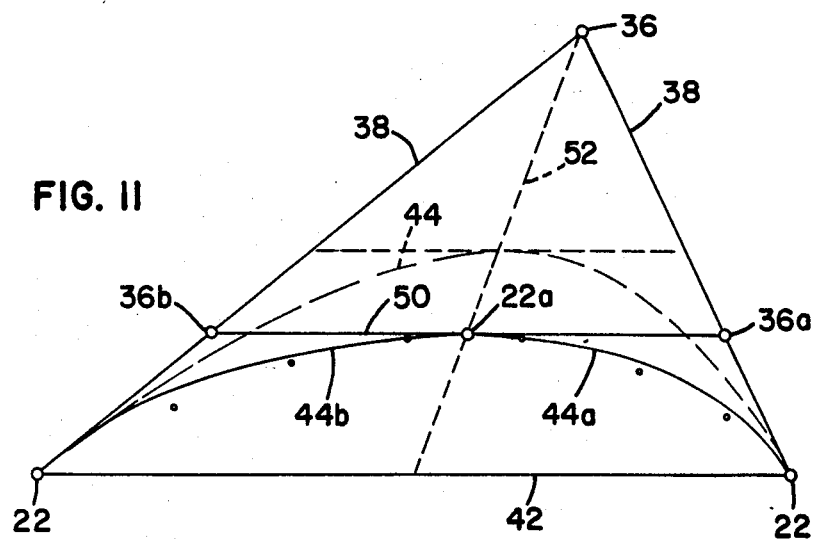
FIG. 11 is a diagramatic representation of the Bezier curve splitting process.

If a subdivision is required, a node 22a is inserted at point 46 and then control points 36a, b on either side are defined at the intersection point of line 50 with sides 38 of triangle 40 as illustrated in FIG. 11. The Bezier curve math may then be performed in each of the two new Bezier curves 44a, b and compared with the predetermined threshold. Further Bezier curve splitting may be carried out in a recursive fashion until the threshold is met and the desired accuracy of fit is derived between Bezier curves 44 and data points 32.

Many display systems utilize polygons as a painting primitive. Therefore, it is necessary, in those cases, to convert the curve series data comprising vertices 22 and control points 36 to polygon data which can then be processed as the painting primitive.

One way to accomplish this is to convert the curve series data to a series of straight line segments which can then be converted to polygon data. The polygon data includes the coordinates of the polygon vertices. The coordinates of the polygon vertices are derived by substituting evenly incremented values of Z between zero and one into the Bezier curve parametric equations of each Bezier curve defining the edges of the curve series represented.

The resultant polygon must have a sufficient number of vertices such that the polygon edges will appear smooth on the display device. However, the number of vertices needed per Bezier curve 44 between adjacent nodes 22 for a smooth appearance should be maintained at a minimum to reduce the computational time for generating the vertex list, clipping the resultant polygon, and scanline conversion of the polygon. The minimum number of vertices required to assure a smooth appearance will depend on the resolution of the viewing device, the length of the span between nodes, the radius of curvature at each point along the span, etc.

Figure 12:
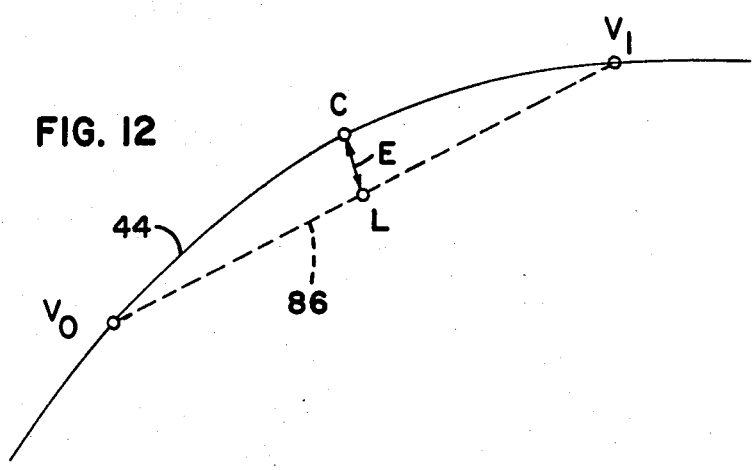
FIG. 12 is a diagramatic representation of the distance computation between a portion of a Bezier curve and a corresponding polygon straight line segment approximation.

In one embodiment of the present invention as illustrated in FIG. 12, the number of vertices or straight line segments required for a given Bezier curve is determined by measuring the distance E between a point C lying on the Bezier curve 44 between two adjacent vertices $V_0$, $V_1$ and a point L lying on a polygon line segment 86 between vertices $V_0$, $V_1$. The X, Y coordinates for C and L, (Cx, Cy) and (Lx, Ly) are defined by the parametric equations defining the Bezier curve wherein the points C and L represent an incremental value of Z which is only one half that between vertices $V_0$, $V_1$:

$$Cx = \frac{P_1 Z_I}{2} + \frac{P_2 Z_I^2}{4}$$

$$Cy = \frac{Q_1 Z_I}{2} + \frac{Q_2 Z_I^2}{4}$$

$$Lx = \frac{P_1 Z_I}{2} + \frac{P_2 Z_I^2}{2}$$

$$Ly = \frac{Q_1 Z_I}{2} + \frac{Q_2 Z_I^2}{2}$$

$Z_I$ = Increment in parameter Z (Note in the above, it is assumed without any loss of generality that $P_0=Q_0=0$, and that the segment is the first of the sequence of segments.) The difference in X coordinates is:

$$P_2 Z_I^2 / 4$$

The difference in Y coordinates is:

$$Q_2 Z_I^2 / 4$$

Distance E between points C and L may thus be represented as:

$$E = \sqrt{\frac{P_2^2 Z_I^4}{16} + \frac{Q_2^2 Z_I^4}{16}}$$

The above equation may be rewritten as follows:

$$E^2 = \frac{Z_I^4 (P_2^2 + Q_2^2)}{16}$$

$$Z_I^4 = \frac{16 E^2}{(P_2^2 + Q_2^2)}$$

$$Z_I^2 = \frac{4E}{\sqrt{(P_2^2 + Q_2^2)}}$$

$$Z_I = 2\sqrt{E}\,(P_2^2 + Q_2^2)^{-\frac{1}{4}}$$

or $$1/Z_I = \frac{(P_2^2 + Q_2^2)^{\frac{1}{4}}}{2\sqrt{E}}$$

By selecting a value for distance E, the number of straight line segments required for a given Bezier curve may be determined as discussed above. Typically, a distance E is one half of a raster step. When distance $E = \frac{1}{2}$, the number of straight line segments or steps is:

$$\frac{(P_2^2 + Q_2^2)^{\frac{1}{4}}}{\sqrt{2}} \quad \text{or} \quad \sqrt{\frac{\sqrt{P_2^2 + Q_2^2}}{2}}$$

If the comportation of the number of straight line segments is to be performed at the storage or page coordinates resolution, which for example might have 16 bit precision, and output is at the screen resolution, which might be 640×432, and the page to screen conversion is $$X\text{screen} = X\text{page}(XSN/XSD)$$

$$Y\text{screen} = Y\text{page}(YSN/YSD)$$

then the number of line segments will be:

CEILING[SQRT[SQRT((XSN P2/XSD)$^2$+(YSN Q2/YSD)$^2$)/2]]

where CEILING will round a real number upward. If only integers are used, then the number of line segments will be:

SQRT[SQRT((XSN P2/XSD)$^2$+(YSN Q2/YSD)$^2$)/2]+1

Based on the number of line segments (NSTEP), the increment in the parameter is easily calculated as 1/NSTEP and the vertices of the line segments calculated by inserting incremental values of Z into the parametric equation for the Bezier curve.

In an effort to speed up the computation process, a magnitude computation method illustrated below can be utilized to approximate the number of line segments so as to avoid multiplications, double precision arithmetic and iterations.

Number of segments or $1/Z_I \approx (MAG/2)+1$

Where:
MAG = larger of MAX or ($\frac{7}{8}$ MAX + $\frac{1}{2}$ MIN)
MAX = larger of P$_2$ or Q$_2$
MIN = smaller of P$_2$ or Q$_2$ Newton Raphson's method may then be used to derive the number of straight line or steps. The above discussed magnitude computation method has a maximum error of approximately 3%. The computation is invariant with respect to rotation.

Figure 13:
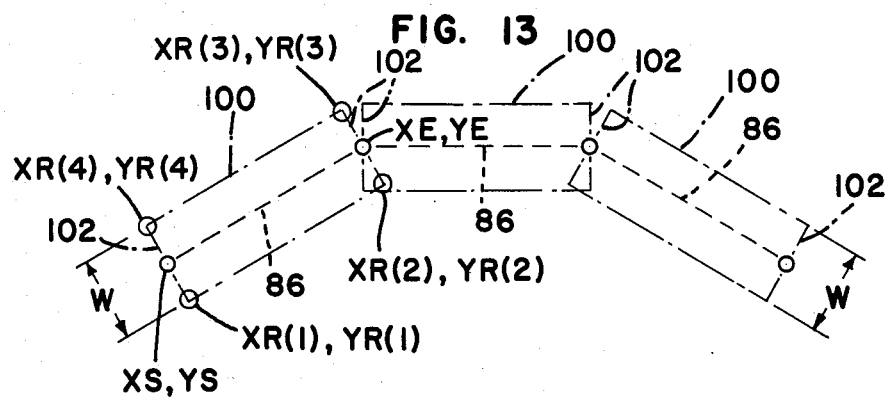
FIG. 13 is a diagramatic representation of rectangle formation.

Once the curve series data including the vertices or nodes 22 and the control points 36, has been converted to the line segments 86, the present invention provides for the line segments 86 to be expanded such that the individual curves of the curve series are provided with a predetermined width. As illustrated in FIG. 13, based on a predetermined width (W) selected by an operator or automatically predetermined, the present invention provides for the definition of a rectangle 100 having a width (W) along each of the line segments 86 of the Bezier curves 44. The line segments 86 divide their associated rectangles 100 into two equal portions each having a width of $\frac{1}{2}$ W and intersect the ends 102 of the rectangles 100 at a 90° angle so as to be perpendicular thereto. The determination of the four corner vertices of each of the rectangles 100 is as follows:

Given:
(XS, YS) = starting point of the line segment
(XE, YE) = ending point of the line segment
W = line width of the line segment The four points of the rectangle:

XR(1), YR(1)

XR(2), YR(2)

XR(3), YR(3)

XR(4), YR(4)

The four points of the associated rectangle are computed as follows:

$$\theta = \tan^{-1}\left(\frac{YE - YS}{XE - XS}\right)$$

$$dy = \frac{W}{2}\cos\theta$$

$$dx = \frac{W}{2}\sin\theta$$

$$XR(1) = XS + dx$$
$$YR(1) = YS - dy$$
$$XR(2) = XE + dx$$
$$YR(2) = YE - dy$$
$$XR(3) = XE - dx$$
$$YR(3) = YE + dy$$
$$XR(4) = XS - dx$$
$$YR(4) = YS + dy$$

Figure 14:
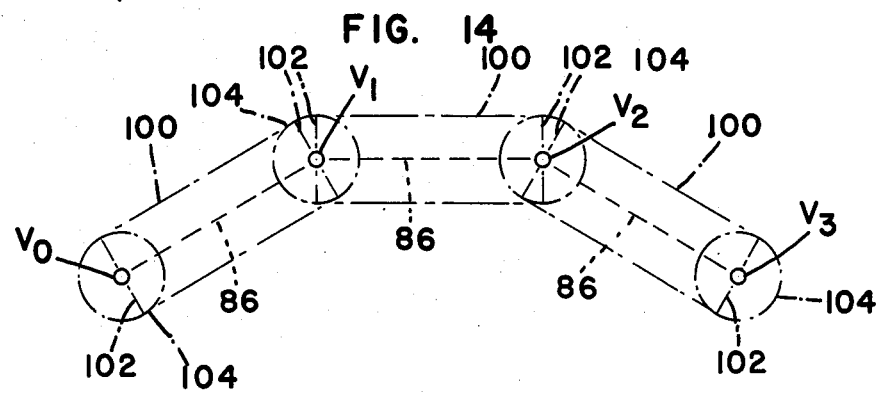
FIG. 14 is a diagramatic representation of rectangle and circle formation.

Next, if so requested by the operator, the ends of each of the rectangles 100 are smoothed and rounded such that the adjacent rectangles 100 aligned end for end form a curve of predetermined width (W). This is accomplished by determining vertices of polygons representing the circumference of circles 104 having a radius of W/2 and centered at each of the vertices V0, V1, V2, V3 as illustrated in FIG. 14.

The polygons representative of the circles 104 can then be displayed utilizing a scan conversion algorithm. The polygon determination is made as follows:
Given:
(Xc, Yc) = coordinator of the circle center
R = radius of the circle
Let:
XP(1), YP(1) = first vertex of the polygon (see FIG. 14a)
XP(n), YP(n) = n th vertex of the polygon
n = vertex count of the polygon
Computation of n (vertex count):

$$\delta\theta = 2\cos^{-1}\left(\frac{2R - 1}{2R}\right)$$

$$n = \left[\frac{2\pi}{\delta\theta}\right]$$

Note: n must be an integer, so round result upward.

The derivation of above equation is as follows (see FIG. 14b):

$$e = R - d$$

$$e = R - R\cos\left(\frac{\delta\theta}{2}\right)$$

$$e = R\left[1 - \cos\left(\frac{\delta\theta}{2}\right)\right]$$

Let e = $\frac{1}{2}$ ($\frac{1}{2}$ is pixel error on the output device resolution).

$$\tfrac{1}{2} = R\left[1 - \cos\left(\frac{\delta\theta}{2}\right)\right]$$

-continued $$\frac{1}{2R} - 1 = -\cos\left(\frac{\delta\theta}{2}\right)$$

$$\cos\frac{\delta\theta}{2} = \frac{2R-1}{2R}$$

$$\delta\theta = 2\cos^{-1}\left(\frac{2R-1}{2R}\right)$$

The XP(i), YP(i) are computed as follows:

$$\Delta\theta = 2\pi/n$$

$$\theta i = (i-1)\Delta\theta$$

$$XP(i) = XC + R\cos\theta i$$

$$YP(i) = YC + R\sin\theta i$$

Where: $i = 1, \ldots, n$

Accordingly, a curve series may be converted into a curve of predetermined width providing a graphic representation of a two dimensional form; for example, the curve series of FIG. 2 may be accordingly made to appear as the character "s" of FIG. 1.

Figure 15:
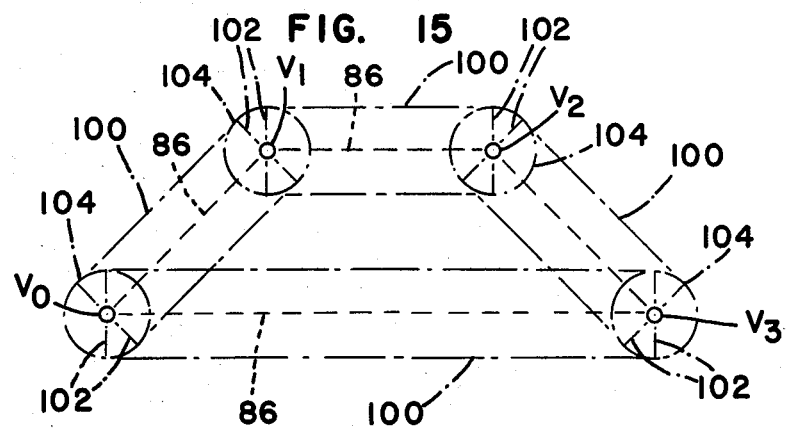
FIG. 15 is a diagramatic representation of a closed curve.

The operator may also request the curve series be closed and not opened as in FIG. 13. As illustrated in FIG. 15, if a closed curve series is requested, the present invention will connect the first and last vertices V0, V3 of FIG. 15 with a straight line 86 and its associated rectangle and round the corners if so requested by the operator.

In the preferred embodiment of the present invention, when beginning a prompting sequence, the operator may select the following parameters:
1. Color of a series presentation.
2. Curve series width.
3. Opened or closed curve series.
4. Point or stream input
5. Curve or straight section.

The first four parameters have previously been discussed. The fifth parameter indicates whether the Bezier curves are to be determined or the individual data connected by straight lines. If point input mode is selected, then the operator manually marks each location at the input device which is to be utilized in determining the Bezier curves of the figure. in the stream input mode, figure data is periodically input to the processing unit.

The present invention further provides for a graphic representation of a figure to be moved or translated on the display media by performing translation or transformation on the vertices 22 and control points 36 as follows:

$$X \text{ new} = X + TX$$

$$Y \text{ new} = Y + TY$$

Where TX and TY are the translation factors of the X and Y coordinates. Furthermore, scaling transformation may be preformed in all vertices and control points of the curve series as follows:

$$X \text{ new} = X\ SX$$

$$Y \text{ new} = Y\ SY$$

Where SX and SY are the scaling factors of the X and Y coordinates.

The curve series may also be rotated about a reference point XR, YR, through an angle A by preforming a rotation on all vertices and control points as follows:

$$X \text{ new} = XR + (X - Xr)\cos A + (Y - Yr)\sin A$$

$$Y \text{ new} = YR - (X - Xr)\sin A + (Y - Yr)\cos A$$

The preferred embodiment to the present invention further enables an operator to select a curve series on a display. The operator indicates a coordinate position on the screen by, for example, the use of cursor. The curve series data for each curve series of the display is converted into rectangle and partial circle data reflecting a curve series of predetermined width. A check is then made to ascertain in which a rectangle or partial circle in a coordinate position was contained. The operator than able to perform whenever operation are necessary on the selected curve series are selected.

Figure 16:
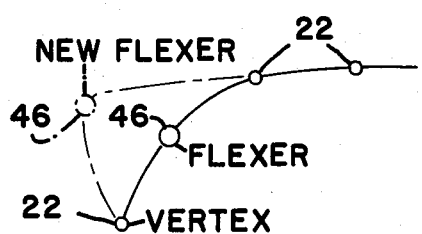
FIG. 16 is a diagramatic representation of flexer modification.
Figure 17:
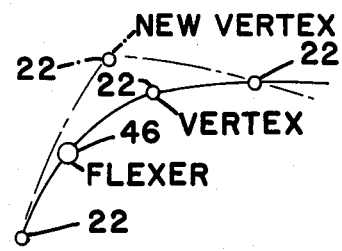
FIG. 17 is a diagramatic representation of vertex modification.

Furthermore, the preferred embodiment of the present invention enables an operator to modify a curve series figure by either modifying the flexer points 46 or the vertices 22. As illustrated in FIGS. 16 and 17 modification of the flexer points 46 and the vertices 22 has varying results on the curve series. This is accomplished by the operator moving a cursor along the vertices 22 and flexers 46 of a curve series. When the cursor is positioned over the appropriate flexer or vertex, the operator then moves the cursor to the desired new location and enters the coordinate position of the cursor. The flexer or vertex selected is then moved to the designated location resulting in a modification of the curve series as illustrated in the example of FIGS. 16 and 17.

Illustrated in FIG. 18 is an example of the processing sequence from curve series vertices 22 and control points 36 determination through imaging of a figure on a graphic device. As shown by step 60, the curve series description data must first be determined as previously discussed. Next at step 62, transformations are performed such as scaling, translation, perspectives, rotation, etc. using well known transformation routines. It is important to note that significant reduction in processing is achieved by performing the transformations with curve series data which is a minimum data set before conversion of the data set to a polygon data set which is an expanded data set. Next as illustrated in step 64 a transformation to screen coordinates is performed. This may be accomplished by any one of several well known conversion techniques. In steps 65, the Bezier curves 44 are converted to line segments and in step 66, the associated rectangles and pies or circles are calculated. In step 67, the data is converted and expanded to polygon data as described above. Once the polygon data has been established, at step 68 well known clipping algorithms can be used to clip portions of the polygon data which will not be displayed on the viewing device. Finally, at step 70, a scanline conversion of the polygon data is performed. At step 72 the figure representation is next displayed on the graphic device.

In yet another embodiment of the present invention there is included a feature which allows insertion, deletion, and modification of Bezier curves 44 whereby the overall shape of a curve series can be edited. This feature provides for the smoothing of the junction between two adjacent Bezier curves 44. As illustrated in FIGS. 19 through 22, four types of juntions are curve-curve, curve-line, line-curve, and line-line.

As illustrated in FIG. 19, two new Bezier curves 44a are defined by moving control points 36 in along control frame 38 to define new control points 36a. New control points 36a are at the intersection of a line 82a which passes through node 22a and control frame 38 and is parallel to line 82 between control points 36. New curves 44a are thus the resulting Bezier curves defined by each set of nodes 22 and 22a and their associated control point 36a. In FIG. 20, a new curve 44a is defined by moving control point 36 in along control frame 38 to define a new control point 36a at the intersection of line 80 and control frame 38. The same process is performed in FIG. 21 where there is a line 80 and Bezier curve 44 junction. In FIG. 22, node 22a which is the junction of two lines 80 is used as the new control point for a new curve 44a. The above described feature thus enables modification of a curve series so as to more accurately represent the form desired.

Accordingly, the present invention provides a method and apparatus for graphic representation of a curve or two dimensional figure having a predetermined, uniform width. Furthermore, the present invention provides for scaling, rotation, reshaping, etc. of the two dimensional form while maintaining the uniform width. Additionally, the present invention provides for the graphic representation of a two dimensional form of uniform width and having a relatively smooth boundary.

It is to be understood, however, that even though numerous characteristics and advantages of the invention have been setforth in the foregoing description, together with details of the structure and function of the invention, the disclosure is illustrative only, and changes may be made in detail, especially in matters of shape, size and arrangement of parts within the principle of the invention, to the full extent extended by the broad generally meaning of the terms in which the appended claims are expressed.

What is claimed is:

1. In a computer aided or generated graphics system, a method of graphical representation of a two dimensional form of uniform width on a display media, comprising the steps of:

providing a set of data points generally located along a longitudinal center line of the two dimensional form;

converting said data points to second sets of data for second or higher order parametric equations which define a plurality of adjoining curves that closely approximate said center line;

converting said second set of data to a plurality of line segments closely approximating each of said adjoining curves;

defining for each line segment four vertices of a rectangle having a predetermined uniform width, each of said rectangles being divided by its associated line segment into two generally equal portions, said rectangles generally defining the two dimensional form;

smoothing the junction of said rectangles; and recreating a graphic representation of said two dimensional form from the smooth rectangle data.

2. A method in accordance with claim 1, where said step of converting said second sets of data to sets of data for a plurality of adjoining straight lines includes the step of converting said second sets of data to sets of forward-difference data for a plurality of adjoining straight line segments closely approximating said curves defined by said second sets of data.

3. A method in accordance with claim 2, wherein said step of converting said second sets of data to forward-difference data for a plurality of straight line segments includes the steps of adding to the present coordinates first order of increment and adding to the first order of increment a second order of increment.

4. A method in accordance with claim 1, wherein the step of converting said data points to second sets of data for second or higher order parametric equations which define a plurality of adjoining curves that closely approximate said center line includes the steps of analyzing said set of data points representing the periphery of the shape to identify as node points the maximum value, minimum value, starting, ending and inflection points of said shape, and the step of establishing control points for adjacent pairs of node points, the control points and the node points defining second or higher order parametric curves interconnecting the node points to closely approximate the center line.

5. A method in accordance with claim 4, wherein the step of establishing control points for adjacent pairs of node points includes defining a control line through each of the node points of the adjacent pairs of node points, the control lines being parallel to a line through the data points on either side of the node points through which the control lines extend, the control points being defined by the intersection of the control lines of the adjacent pairs of node points.

6. A method in accordance with claim 5, wherein the plurality of adjoining curves comprise Bezier curves.

7. A method in accordance with claim 6, wherein the Bezier curves are defined by the following parametric equations:

$$X = P_0 + P_1 Z + P_2 Z^2$$

$$Y = Q_0 + Q_1 Z + Q_2 Z^2$$

where: Z varies from 0 to 1 and where $P_0$, $P_1$, $P_2$, $Q_0$, $Q_1$ and $Q_2$ are defined as follows:

$P_0 = X(i)$
$P_1 = 2[Xc(i) - X(i)]$
$P_2 = X(i) - 2Xc(i) + X(i+1)$
$Q_0 = Y(i)$
$Q_1 = 2[Yc(i) - Y(i)]$
$Q_2 = Y(i) - 2Yc(i) + Y(i+1)$

Xc(i), Yc(i) are control point coordinates between adjacent nodes whose coordinates are X(i), Y(i), and X(i+1), Y(i+1).

8. A method in accordance with claim 1, wherein the step of converting said second set of data to a plurality of line segments includes the step of measuring a distance E between a point C lying on one of the curves between two adjacent vertices and a point L lying on a polygon line segment between the vertices and selecting a maximum value for the distance E whereby the number of straight line segments required for a given parametric curve may be determined by the following equation:

$$1/Z_1 = \frac{(P_2^2 + Q_2^2)^{\frac{1}{2}}}{2\sqrt{E}}.$$

wherein $Z_I$ equals increment in parameter Z between 0 and 1.

9. A method in accordance with claim 1, wherein the step of smoothing the junction of said rectangles includes defining a circle having a center point at the intersection of each of the line segments and further having a diameter equal to the width of the rectangles associated with the line segments, whereby an arc of the circle interconnecting spaced apart corners of the rectangle is utilized to smooth the junction of the rectangles.

10. In a computer aided or generated graphics system, an apparatus for graphical representation of a two dimensional form on a display media, said graphic design apparatus comprising;
an input device for inputting a set of data points positioned generally along a line having a longitudinal configuration similar to the two dimensional form;
control means for converting the data points into second sets of data for second or higher parametric equations which define a plurality of adjoining curve segments that closely approximate said line;
second control means for converting each of said curve segments into one or more straight line segments;
third control means defining for each of said line segments corner vertices associated with a rectangle, said rectangles closely approximating the configuration of the two dimensional form; and
means for presenting said rectangle vertices data on a media so as to closely approximate the two dimensional form.

11. An apparatus in accordance with claim 10, further including fourth control means for smoothing the ends of said rectangles.

12. In a computer aided or generated graphics system, a method of providing a graphical representation of a curve with a uniform width on a display media, comprising the steps of;
providing a set of data points generally along said curve;
converting said data points to second sets of data for second or higher order parametric equations which define a plurality of adjoining curve segments closely approximating said curve;
converting each of said curve segments to one or more straight line segments closely approximating said associated curve segments;
defining in association with each of said straight line segments, the vertices of a rectangle having a width equal to the width of the curve; and
utilizing said rectangle vertices to recreate on a medium, a two dimensional image having a uniform width representative of the desired curve width.

13. In a computer aided or generated graphics system, a method of graphical representation of a dimensional form of uniform width on a display media, comprising the steps of;
providing a first set of data points generally located along a longitudinal center line of the two dimensional form;
converting said data points to second sets of data for second or higher order parametric equations which define a plurality of adjoining curves that closely approximate said center line, including the steps of analyzing said first set of data points to identify as node points the maximum value, minimum value, starting, ending and inflection points of said center line, and the step of establishing control points for adjacent pairs of node points, the control points and the node points defining second or higher order parametric curves interconnecting the node points to closely approximate said center line; and
converting said second sets of data to a plurality of adjoining straight line segments closely approximating said center line.

* * * * *

UNITED STATES PATENT AND TRADEMARK OFFICE
CERTIFICATE OF CORRECTION

PATENT NO.  : 4,620,287
DATED       : October 28, 1986
INVENTOR(S) : David S. Yam It is certified that error appears in the above-identified patent and that said Letters Patent is hereby corrected as shown below:

In Col. 9, line 49, delete "in" and insert --In--.

In Col. 10, line 8, delete "(x=xr)" and insert --(X=Xr)--.

In Col. 10, line 21, delete "than" and insert --is then--.

In Col. 11, line 68, delete "adjoining straight lines" and insert --adjoining straight line segments--.

Signed and Sealed this

Seventh Day of April, 1987

*Attest:*

DONALD J. QUIGG

*Attesting Officer*      *Commissioner of Patents and Trademarks*